United States Patent [19]

Stedman

[11] 4,056,288
[45] Nov. 1, 1977

[54] ENDLESS TRACK FOR CRAWLER VEHICLES

[75] Inventor: Robert N. Stedman, Chillicothe, Ill.

[73] Assignee: Caterpillar Tractor Co., Peoria, Ill.

[21] Appl. No.: 662,200

[22] Filed: Mar. 1, 1976

[51] Int. Cl.² .................................................. B62D 55/24
[52] U.S. Cl. .................................................... 305/34; 305/57
[58] Field of Search ............... 305/34, 35 EB, 37, 38, 305/19, 57

[56] References Cited

U.S. PATENT DOCUMENTS

| | | | |
|---|---|---|---|
| 2,338,817 | 1/1944 | Mayne | 305/10 |
| 2,748,827 | 6/1956 | Kerr et al. | 305/34 X |
| 3,170,533 | 2/1965 | Fewel et al. | 305/34 X |
| 3,606,921 | 9/1971 | Grawey | 152/354 |
| 3,773,394 | 11/1973 | Grawey | 305/38 |
| 3,871,720 | 3/1975 | Mosshart et al. | 305/51 |
| 3,899,220 | 8/1975 | Grawey et al. | 305/19 |

FOREIGN PATENT DOCUMENTS

| | | | |
|---|---|---|---|
| 1,200,700 | 9/1965 | Germany | 305/34 |

*Primary Examiner*—Robert B. Reeves
*Assistant Examiner*—John P. Shannon
*Attorney, Agent, or Firm*—Wegner, Stellman, McCord, Wiles & Wood

[57] ABSTRACT

An endless track for a track-type vehicle such as a crawler vehicle or the like, including an endless, tire-like, flexible carcass including a fluid receiving chamber that is at least partially collapsible, the chamber being defined by at least two cells arranged in substantially side-by-side orientation and extending about the periphery of the carcass. The cells have substantially equal cross sections and the carcass is provided with irregularities on its interior and exterior surfaces. An endless, flexible, grouser carrying belt is disposed about the exterior surface and secured thereto in interlocked relation by the surface irregularities. A plurality of grousers are located about the periphery of the grouser-carrying belt and are secured thereto and extend outwardly from the exterior surface thereof. An endless, flexible, shield-carrying belt is disposed inwardly of the carcass and is secured thereto on the interior surface of the carcass in interlocked relation by the surface irregularities. A plurality of metal shield plates are secured to the shield-carrier belt on its interior surface protecting the belt from wear upon disposition of the track on the crawler vehicle. A plurality of inwardly directed lugs are carried by the shield-carrying belt and are adapted for registration and engagement with the sprockets on a track laying vehicle.

9 Claims, 3 Drawing Figures

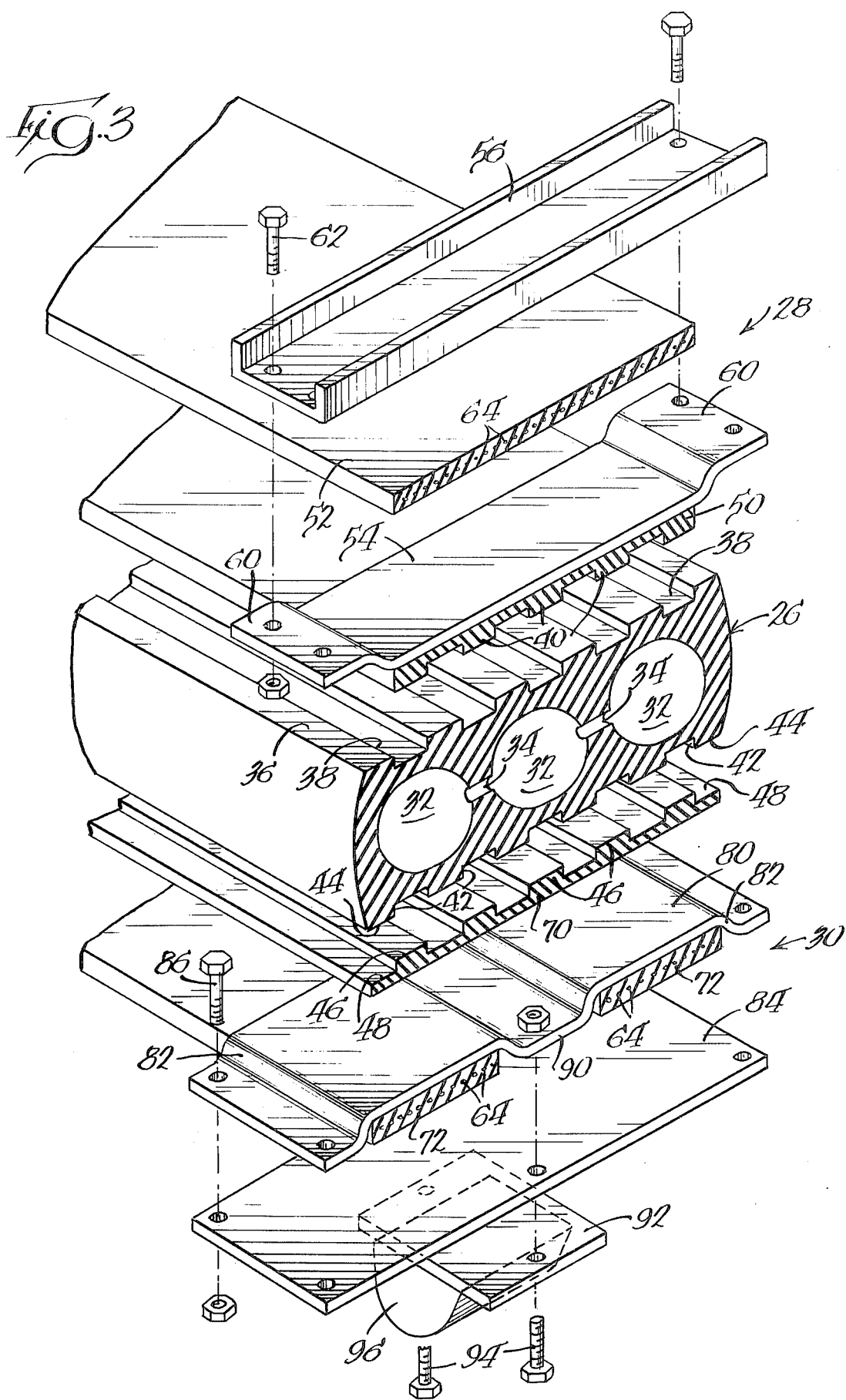

ENDLESS TRACK FOR CRAWLER VEHICLES

BACKGROUND OF THE INVENTION

This invention relates to endless track constructions for track laying vehicles, such as crawler tractors, or the like, and, more particularly, to a track including a peripheral, fluid receiving chamber.

Prior art of possible relevance includes the following U.S. Pat. Nos.: 2,338,817 issued Jan. 11, 1944 to Mayne; 2,748,827 issued June 5, 1956 to Kerr et al.; 3,606,921 issued Sept. 21, 1971 to Grawey; 3,773,394 issued Nov. 20, 1973 to Grawey; 3,871,720 issued Mar. 18, 1975 to Mosshart; and 3,899,220 issued Aug. 12, 1975 to Grawey et al. Additionally, German Auslegeschrift No. 1,200,700 may be of relevance.

Tracks currently employed in track laying vehicles, such as crawler tractors, or the like, are quite noisy in operation. With ever-increasing concern for the effects of noise pollution in working environments, it is highly desirable that the noise level due to noise generated by the track of such vehicles during operation be substantially reduced. At the same time, it is desirable that the track structures giving rise to reduced noise levels be long-lived and that the various components, to the extent feasible, be readily replaceable to facilitate servicing in the field.

SUMMARY OF THE INVENTION

It is the principal object of the invention to provide a new and improved endless track assembly for track laying vehicles, such as crawler vehicles. More specifically, it is an object of the invention to provide such a track wherein the same may be employed on such vehicles to reduce the noise level attendant the operation of such vehicles, and which can be easily serviced.

An exemplary embodiment of the invention achieves the foregoing object in an endless track assembly including a first endless, flexible belt having metal grousers secured about the periphery thereof and directed outwardly from the exterior surface of the belt. An endless, tire-like, flexible, collapsible carcass including a fluid receiving chamber having an exterior surface removably secured to the interior surface of the first endless belt is also provided. A second, endless, flexible belt is included and has an exterior surface removably secured to the interior surface of the carcass and mounts a plurality of sprocket engaging lugs directed inwardly from the interior surface for engagement with the sprockets on a track frame of a track laying vehicle. The belts and the carcasses are constructed and arranged to permit disassembly when the carcass is partially collapsed and to preclude disassembly when installed on a crawler vehicle or the like and when the carcass chamber is filled with fluid.

In a preferred embodiment, there is provided a series of protective metal plates secured to the interior surface of the second belt to act as a wear absorbing shield. Preferably, interlocking formations are disposed on the belts and the carcass at their respective interfaces thereof to assist in maintaining the assembly securely fastened together.

In a highly preferred embodiment, each endless belt is formed of two belt members sandwiching mounting plates. The mounting plates on the first endless belt mount the grousers and the mounting plates on the second endless belt mount the metal shield plates on the interior surface of the second belt as referred to in the preceding paragraph.

Peripheral reinforcement for the endless belts is provided to preclude peripheral enlargement to ensure that the assembly is affixed together when the chamber is not partially collapsed.

Preferably, the fluid chamber comprises a plurality of peripheral, side-by-side cells, generally of substantially equal cross section so that upon filling of the same with fluid, the endless belt is substantially equally supported by the carcass from one side to the other.

Other objects and advantages will become apparent from the following specification taken in connection with the accompanying drawings.

DESCRIPTION OF THE DRAWINGS

FIG. 3 is an enlarged, exploded view of the track assembly with parts shown in section.

DESCRIPTION OF THE PREFERRED EMBODIMENT

Figure 1:
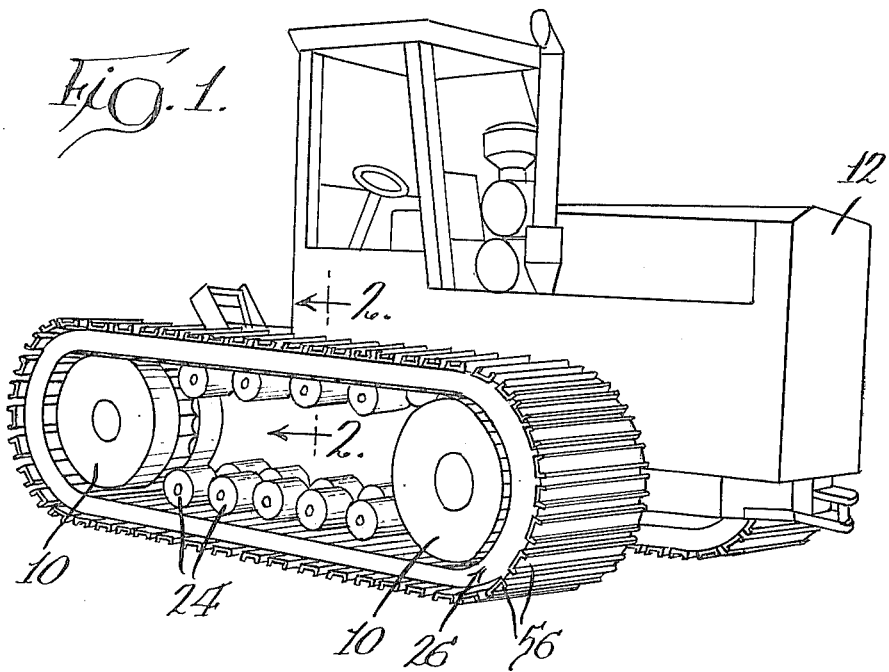
FIG. 1 is a perspective view of a crawler-type vehicle having an endless track made according to the invention.

An exemplary embodiment of an endless track assembly made according to the invention is illustrated in FIG. 1 as being trained about sprockets 10 mounted on a track frame (not shown) of a track laying vehicle, such as a crawler tractor 12. The track frame mounts idler rollers 24 in a conventional fashion.

Figure 2:
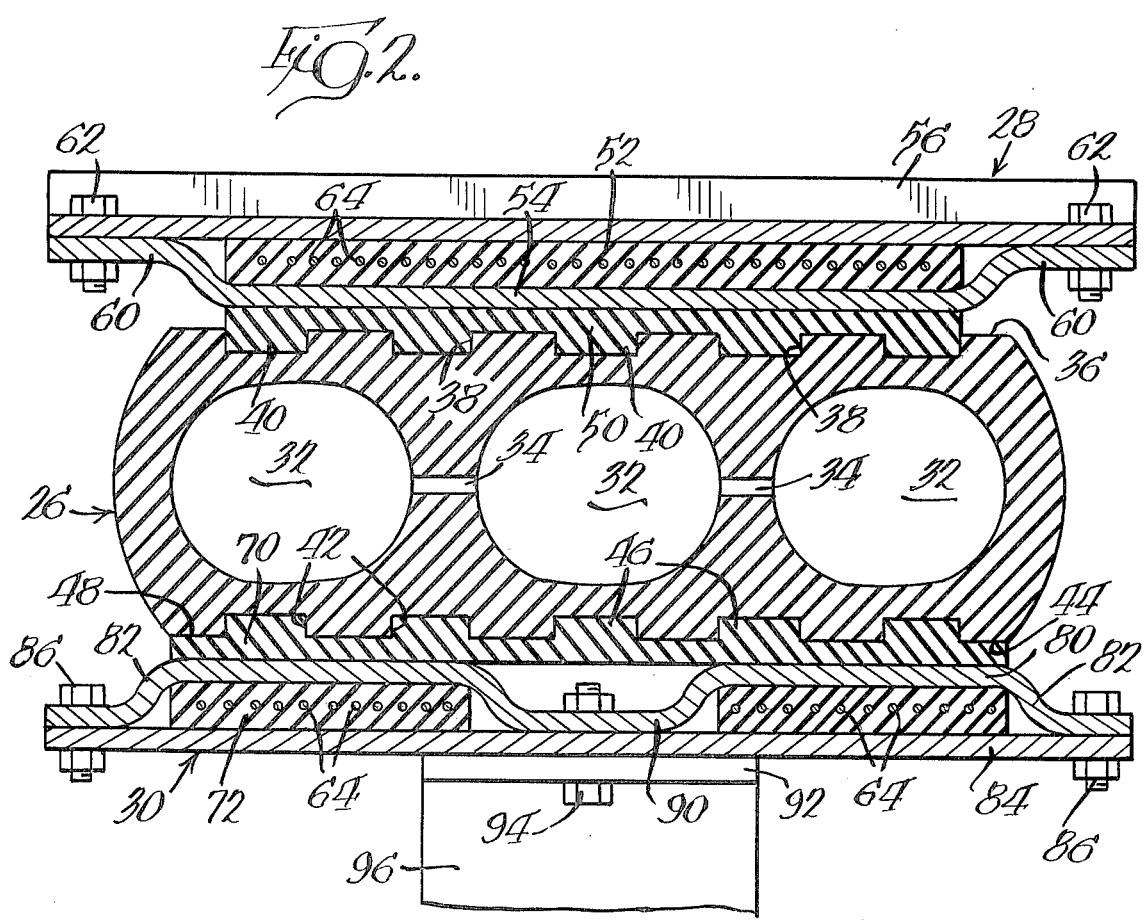
FIG. 2 is an enlarged, sectional view taken approximately along the line 2—2 of FIG. 1.

As can be seen from FIGS. 1 and 2, the track is formed of three basic components. The first is an endless, tire-like, flexible carcass, generally designated 26, which preferably is fabricated according to the method disclosed in Grawey U.S. Pat. No. 3,606,921, mentioned above.

A second component is a grouser-carrying belt, generally designated 28, which may be fabricated generally along the lines disclosed in U.S. Pat. Nos. 3,773,394 or 3,899,220 to Grawey and Grawey et al., respectively.

A third component is a shield and lug-carrying belt, generally designated 30.

The carcass 26 is provided with a plurality of peripheral, side-by-side fluid receiving cells 32, as best seen in FIGS. 2 and 3. The cells 32 may be periodically interconnected by small conduits 34 and generally will be filled with an incompressible fluid such as water. However, if desired, air under pressure could be employed.

The exterior surface 36 of the carcass 26 is provided with a plurality of outwardly opening grooves 38 which are peripherally extending and serve as interlocking irregularities which receive peripheral ribs 40 on the interior surface of the grouser-carrying belt 28. Similar peripheral grooves 42 are provided on the interior surface 44 of the carcass for receipt of ribs 46 on the exterior surface 48 of the shield and lug carrying belt 30.

The carcass 26 is at least partially collapsible by removing the fluid from the cells 32 so as to enable the belts to be disposed thereabout in the configuration illustrated. Thereafter, fluid may be admitted to the cells 32 to cause the carcass 26 to assume the configuration illustrated in FIG. 2 and firmly lock the belts 28 and 30 in place.

As can be seen in FIG. 2, the grouser-carrying belt 28 is formed of first and second belt members 50 and 52, respectively which sandwich an elongated metal plate or bracket 54 which extends generally parallel to channel-like grousers 56 secured to the belt 28 about its periphery. Both ends of the brackets 54 are upturned, as illustrated at 60, to have an upper surface substantially in the plane of the upper surface of the belt member 52 for receipt of bolts extending through aligned bores to secure the channel-like grousers thereto.

Preferably, peripheral reinforcement is provided for the belt 26, generally in the belt member most remote from the carcass 26, here the belt member 52. Specifically, peripheral cables 64 formed of steel or the like are disposed within the belt member 52 to preclude peripheral enlargement of the same so that the belt 28 cannot stretch to the point where it could become loose on the carcass 26.

The shield-carrying belt 30 is likewise formed of two belt members, designated 70 and 72 respectively. The belt member 70 is in abutment with the carcass 26, while the belt member 72 is in actuality defined by two such belt members and they are disposed to be remote from the carcass 26. Like the belt member 52, the belt member 72 is provided with peripheral steel cables 64 which perform the same function.

The belt members 70 and 72 sandwich a plurality of metal brackets 80 which have downturned ends 82 providing surfaces in the plane of the interior surface of the belt member 72 for mounting a plurality of metal shield plates 84 by means of nuts and bolts 86 extending through suitably aligned bores. The shield plates 84 protect the carcass 26 as well as elastomeric components of the belts 70 and 72 from wearing contact with the track rollers 24 and the sprockets 10.

Each bracket 80 includes a central downturned portion 90 disposed between the belt members 72 which supports the center of the corresponding one of the shield plates 84. In addition, at each such location, a plate 92 inwardly of the shield plate 84 is secured thereto by means of bolts 94 passing through suitable aligned bores. Each plate 92, in turn, mounts an inwardly directed lug 96 which is adapted to engage the sprockets 10 to enable the belt to be driven about the track frame of the vehicle 12.

From the foregoing, it will be appreciated that a track made according to the invention accomplishes the objects previously set forth. The presence of the carcass 26 minimizes noise and vibration in the track during operation of the vehicle. In addition, the provision of the cells 32 in side-by-side relation and their being dimensioned to have the same cross section provides lateral stability from one side of the track to the other, whether filled with an incompressible fluid or with a gas. The unique arrangement of the belts with respect to the carcass permits either or both belts to be readily disassembled from the carcass to be replaced and/or serviced as required. Similarly, the unique use of the brackets for mounting the shield plates 84 and the grousers 56 provides for easy replacement of worn components.

I claim:

1. An endless track for a track laying vehicle such as a crawler vehicle or the like, comprising:
    a first endless, flexible belt having metal grousers secured about the periphery thereof and directed outwardly from the exterior surface thereof;
    an endless, flexible, collapsible carcass including a fluid receiving chamber having an exterior surface removably secured to the interior surface of said first endless belt; and
    a second endless, flexible belt having an exterior surface removably secured to the interior surface of said carcass and a plurality of sprocket engaging lugs directed inwardly from the interior surface thereof;
    said belts and said carcass being constructed and arranged to permit disassembly when said carcass is collapsed and to preclude disassembly when installed on a crawler vehicle or the like and when said carcass is filled with fluid.

2. The endless track of claim 1 further including a series of protective, metal plates secured to the interior surface of said second belt to act as a wear absorbing shield therefor.

3. The endless track of claim 1 wherein interlocking formations are disposed on said belts and said carcass at the respective interfaces thereof.

4. The endless track of claim 1 wherein each said endless belt is formed of two belt members sandwiching mounting plates, the mounting plates on said first endless belt mounting said grousers and the mounting plates on said second endless belt mounting shield plates on the interior surface of said second endless belt.

5. The endless track of claim 4 wherein at least the belt member in each of said endless belts remote from said carcass includes means for substantially precluding peripheral enlargement.

6. The endless track of claim 1 wherein said fluid chamber comprises a plurality of side-by-side cells extending about the periphery of said carcass.

7. An endless track for a track laying vehicle, such as a crawler vehicle or the like, comprising:
    an endless, flexible carcass including a fluid receiving chamber that is at least partially collapsible, said fluid receiving chamber being defined by at least two cells arranged in substantially side-by-side orientation and extending about the periphery of the carcass, said cells having substantially equal cross sections, said carcass being provided with irregularities on its interior and exterior surfaces;
    an endless, flexible, grouser-carrying belt disposed about the exterior surface of said carcass and secured thereto in interlocked relation by said surface irregularities;
    a plurality of grousers extending about the periphery of said grouser-carrying belt and secured thereto and extending outwardly from the exterior surface thereof;
    an endless, flexible, shield-carrying belt inwardly of said carcass and secured to the interior surface thereof in interlocked relation by said surface irregularities;
    a plurality of metal shield plates secured to said shield-carrying belt on the interior surface thereof for protecting said belt from wear upon disposition of said track on a crawler vehicle or the like; and
    a plurality of inwardly directed lugs carried by said shield-carrying belt and adapted for registration and engagement with the sprockets on a track laying vehicle.

8. The endless track of claim 7 wherein each of said belts includes peripheral reinforcement for strengthening the associated belt and for precluding peripheral enlargement to ensure that said belts will be secured to said carcass when said carcass is not in a partially collapsed state.

9. The endless track of claim 7 further including metal brackets extending through each of said belts substantially parallel to the exterior surfaces thereof; the metal brackets extending through said grouser-carrying belt securing said grousers to said grouser-carrying belt and the brackets extending through said shield-carrying belt securing said shields and said lugs to said shield-carrying belt.

* * * * *